United States Patent [19]
Corte

[11] Patent Number: 5,601,382
[45] Date of Patent: Feb. 11, 1997

[54] SOLAR ENERGY IN-SITU SOIL DESORPTION APPARATUS

[75] Inventor: Lawrence J. Corte, Lakewood, Colo.

[73] Assignee: K N Energy, Inc., Lakewood, Colo.

[21] Appl. No.: 435,088

[22] Filed: May 4, 1995

Related U.S. Application Data

[62] Division of Ser. No. 209,243, Mar. 14, 1994.

[51] Int. Cl.$^6$ ....................................... B08B 5/00
[52] U.S. Cl. ..................... 405/128; 405/131; 405/258
[58] Field of Search ................... 405/128, 131, 405/258, 303

[56] References Cited

U.S. PATENT DOCUMENTS

| | | | |
|---|---|---|---|
| 3,063,104 | 11/1962 | Troxel | 135/93 X |
| 3,760,826 | 9/1973 | Rasmussen | 135/92 X |
| 3,812,616 | 5/1974 | Koziol | 135/91 X |
| 3,863,710 | 2/1975 | Masters | 47/2 X |
| 4,007,781 | 2/1977 | Masters | 165/46 |
| 4,055,030 | 10/1977 | Earnshaw | 135/91 X |
| 4,141,798 | 2/1979 | Grosse | 52/DIG. 13 X |
| 4,622,950 | 11/1986 | Greenbaum | 52/63 X |
| 4,834,840 | 5/1989 | Capella | 202/172 |
| 5,035,537 | 7/1991 | Rose | 405/128 |
| 5,193,934 | 3/1993 | Johnson et al. | 405/128 |
| 5,213,445 | 3/1993 | Ikenberry et al. | 405/128 |
| 5,228,804 | 7/1993 | Balch | 405/128 |

*Primary Examiner*—Roger J. Schoeppel
*Attorney, Agent, or Firm*—Fields & Johnson, P.C.

[57] ABSTRACT

A method and apparatus for, decontaminating in-situ soil by use of solar energy is provided. A targeted area of contaminated in-situ soil is covered with a substantially sunlight-transmitting, nonporous covering that allows solar energy to penetrate said covering. A greenhouse effect subsequently occurs in which trapped solar energy heats the interior air within the covering and in-situ soil below the covering. As the in-situ soil is heated, contaminants found within the in-situ soil are vaporized. The structure comprises first and second side panels with attached first and second end panels. An exhaust vent is provided such that vaporized contaminants and air can escape the interior of the covering. An exhaust means can be utilized to further assist in removal of vaporized contaminants and air within the covering. A fresh air intake slot allows replenishment of air that is exhausted or vented with vaporized contaminants. The targeted area of in-situ soil may be plowed or churned such that the surface area of soil exposed to solar energy is increased. Chemical agents may be added to the in-situ soil to assist in decontamination.

2 Claims, 2 Drawing Sheets

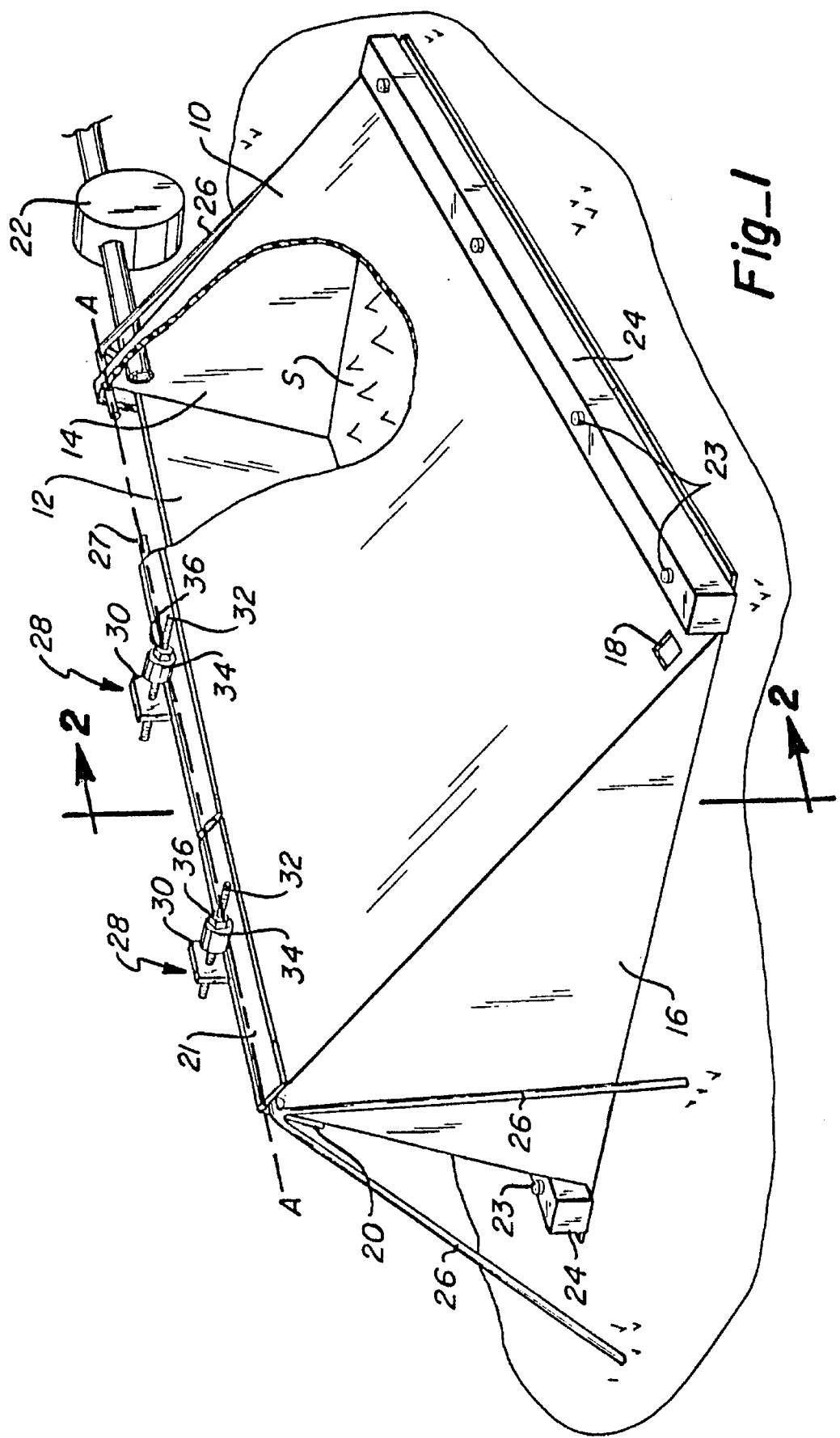

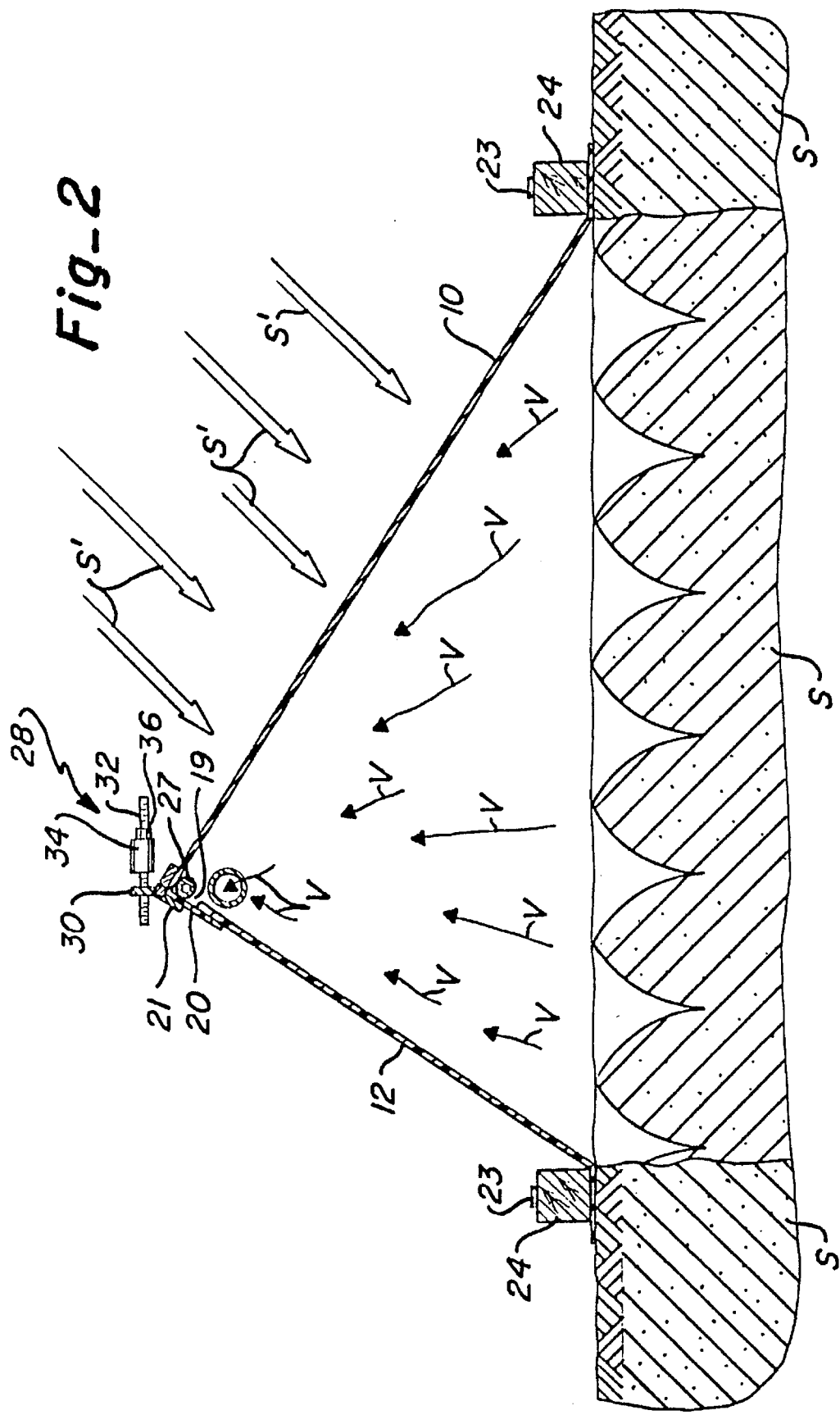

SOLAR ENERGY IN-SITU SOIL DESORPTION APPARATUS

This is a division, of co-pending U.S. application Ser. No. 08/209,243 filed Mar. 14, 1994.

TECHNICAL FIELD

This invention relates to an apparatus and method for decontaminating in-situ soil by use of solar energy. More particularly, it relates to an apparatus that covers a targeted in-situ soil area and utilizes solar energy to decontaminate in-situ soil from volatilizable contaminants.

BACKGROUND ART

Many methods and apparatus exist for decontaminating soil from chemicals, such as hydrocarbons. Common to these inventions are complex and elaborate means for achieving such decontamination by introducing heat to a targeted soil area. The most common method for introducing heat is through heating pipes or the like.

For example, U.S. Pat. No. 5,228,804 to Balch, teaches a method and apparatus for ex-situ remediation of hydrocarbon contaminated soil wherein a pile of contaminated soil is covered with a tarp. A plurality of pipe conduits are inserted into the pile. Decontamination is achieved by volatilizing contaminants through introduction of heated air by the pipe conduits and utilizing solar energy trapped by the tarp.

U.S. Pat. No. 4,834,840 to Capella, discloses an apparatus for managing ex-situ toxic and hazardous waste material containing distillable solvents or chemicals in which the waste materials are collected and introduced into solar dryers, wherein the more volatile solvent or chemical components are distilled and recaptured as byproducts. The apparatus includes a drying tray having a transparent cover such that heat is generated through absorbed solar energy.

U.S. Pat. No. 5,193,934 to Johnson et al., teaches an in-situ thermal desorption system utilizing perforated pipe buried in soil. This invention is directed to removal of organic contaminants whereby the surface of the soil is covered with an impermeable membrane to prevent migration of released vapors. A combustion source provides heat to the soil via the buried piping.

U.S. Pat. No. 5,213,445 to Ikenberry et al., discloses a system and method for remediation of contaminated soil which includes an ex-situ soil stack interspersed with hot air dispensing pipes and vapor extraction pipes. Removal of contaminants is achieved by introduction of the hot air to allow vaporization, and removal of vaporized contaminants through the extraction pipes.

Although each of the foregoing patents disclose devices and processes which are satisfactory for their intended purposes, none discloses a method or apparatus for decontaminating soil by means of solar energy in the manner that is claimed herein.

DISCLOSURE OF THE INVENTION

The present invention contemplates a method and apparatus for decontaminating in-situ soil by use of solar energy. This invention is further directed at removing volatile compounds such as hydrocarbons and other contaminant species from in-situ soils and other subsurface materials for the purpose of environmental protection and advancement of community health and safety.

A solar energy absorbing device is placed over contaminated in-situ soil. During the day time, when solar radiation is most available, the device operates to allow heat to accumulate within its interior, functioning in a similar fashion as a "greenhouse". The greenhouse effect created by the absorption of solar energy amplifies the amount of heat transferred to the in-situ soil, which assists in causing the contaminants to volatilize. As solar energy is absorbed, the in-situ soil is "desorbed" of its volatile chemical contaminants. That is, as the in-situ soil and surrounding air are heated, volatile chemical compounds contaminating the in-situ soil are consequently heated which causes them to change to a vapor phase. Contaminated in-situ soil beneath the device may be plowed or furrowed such that a greater surface area is exposed which results in a more efficient heating of the in-situ soil. As the transformation to a vapor phase takes place, the vaporized contaminants rise away from the and are then vented or exhausted from the device. Exhausted contaminants may be recovered through a vapor recovery system to prevent contamination of the atmosphere. In addition to decontamination through vaporization of volatile contaminants, decontamination may also be achieved through photochemical reaction between the sun and contaminants. Decontamination may be further achieved by adding selected chemicals to the targeted, in-situ soil area. Examples of such chemicals may include oxidation agents, soil nutrients, surfactants, chelating agents, catalysts and temperature adjustment agents. Replacing air vented to the atmosphere or drawn off by the vapor recovery system can be achieved by utilizing a fresh air intake opening that allows fresh air to enter the interior of the device.

More specifically, the apparatus for accomplishing decontamination includes a structure comprising first and second side panels and first and second end panels. The side panels are joined along an apex axis. The end panels are attached to the side panels forming a four sided tent-like structure. The side panels and end panels are substantially sunlight-transmitting and non-porous which allows light to pass through them to create the greenhouse effect and to prevent the escape of vaporized contaminates. Extending along a portion of the length of the apex axis is an exhaust vent that allows vaporized contaminants to escape. The removal of vaporized contaminants may be enhanced by the addition of a exhaust means attached to an end panel near the apex of the apparatus. As contaminates vaporize, the vapor pressure inside the apparatus becomes greater than the surrounding atmosphere. Thus, the exhaust vent and exhaust means allows equilibrium to be reached by allowing the vaporized contaminants to escape. The rate at which contaminants are removed can be increased by utilizing the exhaust means. Along the bottom portion of one side panel is a fresh air intake opening that allows fresh air to enter the interior of the structure. The fresh air is heated through the continuing greenhouse effect which results in further vaporization of contaminants. The apparatus can be secured to the ground by means such as stakes with weighted anchors. Typically, a weighted anchor is staked into the ground along the length of both side panels. In some applications, it may be advantageous to secure the apparatus only at one or more selected panels to enhance the intake of fresh air into the interior of the structure. The exhaust vent may comprise an open slot or space at the apex axis of the device and a flap device which opens, allowing contaminants and air to escape. When the interior vapor pressure exceeds the atmospheric pressure such that there is sufficient force to displace the flap outward, the flap opens. A counter-balance may be attached to the flap to equalize its weight so that a slight increase in air pressure within the tent is sufficient to open the flap and vent the vaporized contaminants and air within. A variety of devices can be used as exhaust means to further assist in removal of vaporized contaminants. Such devices may include a fan system or a pressure relieving system utilizing a vacuum pump.

If it is not desirable to directly vent vaporized contaminants into the atmosphere, a vapor recovery system may be utilized which recovers the vaporized contaminants and places them in a holding means for disposal in an environmentally prudent manner. Such a system may be comprised of a series of pipes connected to the exhaust means of the apparatus whereby exhausted contaminant vapors and air are drawn into the pipes. The pipes may then be connected to a device which condenses the vapors. Condensed vapors may then be conveyed to a holding means whereby such condensed contaminants can be safely disposed of.

The advantages of this device are that no intricate or complex heating means are needed to cause vaporization of contaminants. The greenhouse effect created by the solar energy allows for sufficient heat to cause vaporization. Additionally, a substantially reduced effort is needed to move the device to an adjoining or adjacent contaminated area since the apparatus is of a simple and lightweight construction. Furthermore, storage of the apparatus is more easily and less expensively achieved because the apparatus may be disassembled and folded for transportation.

By use of the method and apparatus-described, contaminated in-situ soil may be decontaminated by comparatively inexpensive and effective means.

Additional advantages of this invention will become apparent from the description which follows, taken in conjunction with the accompanying drawing.

BRIEF DESCRIPTION OF THE DRAWING

FIG. 1 is a perspective view of the apparatus including a cut-away portion of a side panel illustrating the interior of the apparatus and the vacuum means; and FIG. 2 is a cross-sectional view taken along line 2—2 of FIG. 1 showing further details of the apparatus.

BEST MODE FOR CARRYING OUT THE INVENTION

In accordance with this invention, an apparatus is provided, as shown in FIGS. 1 and 2, for decontaminating in-situ soil by use of solar energy in the form of solar radiation. The apparatus comprises a first side panel 10 connected to a second side panel 12 to form a peak along the apex axis A which covers a targeted in-situ soil area S. The resulting configuration between the attached first and second panels results in an inverted V-shaped structure. Parallel with apex axis A on side panel 12 is found a vent opening 19 which extends along a selected length of panel 12 for allowing vaporized contaminants and air to escape. A first end panel 14 and a second end panel 16 are attached to opposite ends of the first and second side panels such that the resulting structure resembles a tent. Although this invention particularly discloses a four sided structure, it will be understood that various other structures with differing shapes can be used, for example, a three or five sided structure. Along the bottom edge of the first side panel 10, is an intake opening 18 that allows fresh air to enter the apparatus. Along the top edge of the second side panel 12 is an exhaust vent flap 20 which covers vent opening 19. The exhaust vent flap 20 extends parallel with apex axis A. Conveniently, vent flap 20 may be made of any substantially rigid material, such as aluminum or plastic, which is connected to a flexible hinge 21 by sewing, rivets or other suitable attaching means (not shown). Hinge 21 may be made of the same material as panels 10 and 12.

In addition to the vent 19, volatilized contaminants may be removed by an exhaust means 22, which may take the form of a vacuum pump or fan system.

It will be appreciated that the size of the intake opening 18, the exhaust vent flap 20 and exhaust means 22 can vary depending upon the volume of air that is desired to be cycled through the apparatus. Once the apparatus is placed over the targeted area of in-situ soil, it can be secured to the ground by common means such as stakes 23 with weighted anchors 24. The side and end panels are supported above the ground by a plurality of support poles 26. Typically, a single horizontal support 27 traverses the length of the apex axis A with support poles 26 connecting to horizontal support 27.

Prior to placing the apparatus over the in-situ soil, the targeted area may be plowed or churned in order to increase the surface area of soil exposed to the interior air space covered by the panels. Plowing to a depth of 2 feet may typically be done to achieve optimum vaporization of contaminants. Additionally or alternatively, chemical additives may be added to the targeted in-situ soil to assist in decontamination. Examples of such additives are oxidation agents, soil nutrients, surfactants, chelating agents, catalysts and temperature adjustment agents.

It is desirable that the side and end panels of the structure be constructed of a sunlight-transmitting material that allows sunlight to pass through it. It is also desirable to have such material substantially non-porous so that air and other vapors do not escape. It will be appreciated that the interior air space of the apparatus is necessary to create the sufficient greenhouse effect. A greater interior air space results in a greater greenhouse effect. This greenhouse effect causes heating of the interior air within the structure. Consequently, the in-situ soil covered by the structure is also heated by convection, conduction and by direct solar radiation. As the in-situ soil beneath the apparatus is heated, contaminants within the soil begin to vaporize. The soil vapor or fluid is withdrawn from the sub-surface of the contaminated material by the effects of capillary adhesion, gaseous diffusion and a soil vapor/soil fluid extraction zone forms to volatilize and desorb contaminates in the in-situ soil or liquid or mixture thereof. As vaporization occurs, pressure within the structure increases to exceed atmospheric pressure such that contaminated vapor and air are released through the vent opening 19 and/or exhaust means 22. Simultaneously, as contaminated vapor and air leave the apparatus, fresh air is drawn in through the intake opening 18. As illustrated in FIG. 2, the solar radiation shown by arrows S' penetrate the side panel 10 causing volatile contaminants shown by arrows V to rise to the apex to be removed by exhaust means 22 and/or vent opening 19.

The exhaust vent 20 may be equipped with a counterbalance device 28. This device 28 comprises flange 30 which attaches to and extends upwardly from flexible hinge 21. Attached perpendicular to flange 30 is a threaded rod 32 which has a counterweight 34. Counterweight 34 can be positioned along rod 32 such that the device 28 provides variable counteracting force with respect to the weight of flap 20. Counterweight 34 is secured in place by holding nut 36. When vapor pressure within the structure is exceeds atmospheric pressure, flap 20 will, be forced open allowing the escape of the airborne contaminates. When the air pressure within the structure drops to or below atmospheric pressure, flap 20 will close again.

The flap 20, as shown in FIG. 1, extends along the entire length of the exhaust vent opening 19. However, it will be appreciated that such a flap may be shortened to achieve the desirable pressure equalization.

This invention has been described in detail with reference to a particular embodiment thereof, but it will be understood that various other modifications can be effected within the spirit and scope of this invention.

I claim:

1. A tent-like apparatus for removing volatile contaminants from in-situ soil by heating the in-situ soil and air within said apparatus, said apparatus comprising:

a first sunlight-transmitting side panel having first and second ends and a lower edge, said lower edge being in contact with the surface of the ground, said first panel extending from the surface of the ground to a first top edge at an apex axis;

a second sunlight-transmitting side panel having first and second ends and a lower edge, said lower edge being in contact with the surface of the ground, said second panel extending from the surface of the ground to a second top edge at the apex axis and connected to said first top edge to form a longitudinal peak;

a first sunlight-transmitting end panel extending from the surface of the ground to the apex axis and connected to said first ends of said first and second side panels;

a second sunlight-transmitting end panel extending from the surface of the ground to the apex axis and connected to said second ends of said second side panels, said first and second side panels and said first and second end panels forming a tent-like structure having an interior air space;

an exhaust vent formed along said peak so that air containing volatile contaminants can escape;

a flap normally covering said exhaust vent;

a flap control mean on said flap responsive to increased air pressure within said apparatus due to heating the air to open said flap to allow air containing volatile contaminants released from the soil during heating to escape from the apparatus; and an intake means positioned through said apparatus on one of said panels or ends thereof above said lower edge for replenishing escaped air.

2. An apparatus, as claimed in claim 1, said flap control means further including;

an adjustable counterbalance for regulating the air pressure within said apparatus.

\* \* \* \* \*

UNITED STATES PATENT AND TRADEMARK OFFICE
CERTIFICATE OF CORRECTION

PATENT NO.    :  5,601,382
DATED         :  February 11, 1997
INVENTOR(S)   :  Lawrence J. Corte It is certified that error appears in the above-identified patent and that said Letters Patent is hereby corrected as shown below:

Column 2, line 18, after "the" insert -- in-situ soil--

Signed and Sealed this

Seventh Day of April, 1998

Attest:

BRUCE LEHMAN

Attesting Officer    Commissioner of Patents and Trademarks